(12) United States Patent
Nakamura

(10) Patent No.: US 8,693,066 B2
(45) Date of Patent: Apr. 8, 2014

(54) IMAGE READING DEVICE AND METHOD FOR MANUFACTURING THE SAME

(75) Inventor: Kuniaki Nakamura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 119 days.

(21) Appl. No.: 13/359,134

(22) Filed: Jan. 26, 2012

(65) Prior Publication Data

US 2012/0194878 A1 Aug. 2, 2012

(30) Foreign Application Priority Data

Jan. 27, 2011 (JP) ................................. 2011-014756

(51) Int. Cl.
*H04N 1/04* (2006.01)

(52) U.S. Cl.
USPC ........... 358/474; 358/471; 358/475; 382/312; 156/275.5

(58) Field of Classification Search
USPC ......... 358/474, 475, 509, 501, 513, 482, 483; 382/312; 156/375.5, 329, 330
See application file for complete search history.

(56) References Cited

U.S. PATENT DOCUMENTS

| 6,295,141 | B1 * | 9/2001 | Ogura et al. ................... 358/475 |
| 6,326,602 | B1 * | 12/2001 | Tabata ....................... 250/208.1 |
| 6,337,476 | B2 * | 1/2002 | Tabata ....................... 250/208.1 |
| 6,343,162 | B1 * | 1/2002 | Saito et al. ..................... 382/312 |
| 6,556,317 | B2 * | 4/2003 | Tabata et al. .................. 358/509 |
| 6,563,609 | B1 * | 5/2003 | Hattori .......................... 358/475 |
| 6,724,503 | B1 * | 4/2004 | Sako et al. ..................... 358/483 |
| 6,933,487 | B2 * | 8/2005 | Nakamura et al. .......... 250/208.1 |
| 7,085,023 | B2 * | 8/2006 | Okamoto et al. ............. 358/471 |
| 7,095,003 | B2 * | 8/2006 | Matsumoto ................ 250/208.1 |
| 7,284,891 | B2 * | 10/2007 | Saito et al. ..................... 362/615 |
| 7,286,270 | B2 * | 10/2007 | Oshima et al. ................ 358/474 |
| 7,508,554 | B2 * | 3/2009 | Tomita et al. ................. 358/483 |
| 7,859,726 | B2 * | 12/2010 | Endo et al. ..................... 358/474 |
| 7,903,298 | B2 * | 3/2011 | Sawada et al. ................ 358/484 |
| 7,990,584 | B2 * | 8/2011 | Ikeda ............................. 358/484 |
| 8,130,426 | B2 * | 3/2012 | Sawada et al. ................ 358/484 |
| 8,310,737 | B2 * | 11/2012 | Nagao et al. .................. 358/475 |

FOREIGN PATENT DOCUMENTS

JP 2007-027137 2/2007

* cited by examiner

*Primary Examiner* — Negussie Worku
(74) *Attorney, Agent, or Firm* — Hamre, Schumann, Mueller & Larson, P.C.

(57) ABSTRACT

An image reading device and a method for manufacturing the same are provided, where the image reading device is capable of being assembled more efficiently. The image reading device includes: an optical part, extending long in a direction; a case, having an accommodating portion for accommodating the optical part; and a light receiving component, accommodated in the case. The optical part is fixed in the accommodating portion through a first adhesive and a second adhesive with hardening time longer than that of the first adhesive.

16 Claims, 17 Drawing Sheets

IMAGE READING DEVICE AND METHOD FOR MANUFACTURING THE SAME

BACKGROUND OF THE INVENTION

1. Field of the Invention

The present invention relates to an image reading device and a method for manufacturing the same.

2. Description of the Related Art

In an apparatus such as a fax machine, a copy machine, or a scanner, an image reading device for reading an original manuscript is installed. FIG. 18 shows an example of the image reading device (for example, referring to Patent Document 1). The image reading device X shown in FIG. 18 includes a case 91, a linear light source 92, a lens array 93, a substrate 94, and a receiving element 95 carried on the substrate 94. The case 91 includes a light source accommodating portion 911 for accommodating the linear light source 92 and a lens accommodating portion 912 for accommodating the lens array 93. The linear light source 92 includes a light guiding body 921 extending long in a main scanning direction and a white case 922 for accommodating the light guiding body 921. An opening is formed on a side of the white case 922, so as to expose a light emitting portion 921a of the light guiding body 921. Furthermore, the linear light source 92 includes a light source unit (not shown) fixed on an end portion of the white case 922 in the main scanning direction. A Light Emitting Diode (LED) is mounted into the light source unit to provide light for the light guiding body 921. The light from the light source unit goes forward in the light guiding body 921 in the main scanning direction, and a part of the light is emitted from the light emitting portion 921a. A glass cover 96 shown in FIG. 18 is disposed on the apparatus in which the image reading device X is installed. In the image reading device X, the linear light source 92 is used to illuminate the original manuscript G, and the lens array 93 is used to guide reflected light into the light receiving element 95, so as to read the original manuscript G.

The image reading device X is formed so that when the linear light source 92 is accurately disposed in the light source accommodating portion 911 of the case 91, the original manuscript G is well illuminated. For example, if the linear light source 92 is installed in a state of inclining toward the light source accommodating portion 911, the original manuscript G is non-uniformly illuminated, and the quality of the read image can be deteriorated. Moreover, if deviation occurs in the position of the lens array 93 in the lens accommodating portion 912, light from the original manuscript G can not be smoothly received by the light receiving element 95. Therefore, an adhesive, for example, needs to be used to fix the linear light source 92 and the lens array 93 in a specified position. If silicone resin hardened at a normal temperature is used as the adhesive, it takes a long time to harden. In this case, the image reading device X needs to be held still for a long time, so that the positions of the linear light source 92 and the lens array 93 do not deviate.

Another issue with the image reading device X is that faster assembly is required during manufacture. The time required fixing the linear light source 92 and the lens array 93 to harden the silicone resin hinders efficient assembly.

Patent Document 1: Japanese Patent Laid-Open Publication No. 2007-27137

SUMMARY OF THE INVENTION

The present invention is completed through research addressing the aforementioned issues, with the objective of providing an image reading device and a method for manufacturing the same, where the image reading device is capable of being assembled more efficiently.

An image reading device according to a first embodiment of the present invention includes: an optical part, extending long in a first direction; a case, having an accommodating portion for accommodating the optical part; and a light receiving component, accommodated in the case. The optical part is fixed in the accommodating portion through a first adhesive and a second adhesive with hardening time longer than that of the first adhesive.

In a preferred embodiment, the optical part includes a lens array enabling light to converge on the light receiving component; and the accommodating portion includes a lens accommodating portion for accommodating the lens array.

Preferably, the case includes a plurality of cavities, and the cavity is adjacent to the lens accommodating portion in a second direction orthogonal to the first direction and concave in a manner of being away from the lens array in the second direction; the cavities includes a first adhesive disposing cavity coated with the first adhesive; and the second adhesive is coated in the first adhesive disposing cavity in a manner covering the first adhesive.

Preferably, the cavities includes a pair of cavities disposed on the same position in the first direction and clamping the lens array in the second direction; the pair of cavities are coated with the second adhesive; and at least one of the pair of cavities is the first adhesive disposing cavity.

Preferably, the cavities are arranged in the first direction; and the cavities located at two ends in the first direction are the first adhesive disposing cavity.

In a preferred embodiment, the optical part includes a linear light source extending long in the first direction; and the accommodating portion includes a light source accommodating portion for accommodating the linear light source.

Preferably, the light source accommodating portion has a strip-shaped bottom surface overlapping with the linear light source when viewed from a third direction orthogonal to the first direction and the second direction, and a strip-shaped plane adjacent to the strip-shaped bottom surface in the second direction and not overlapping with the linear light source when viewed from the third direction; the strip-shaped plane is coated with the first adhesive; and the strip-shaped bottom surface is coated with the second adhesive.

Preferably, the strip-shaped plane has a plurality of first adhesive disposing regions arranged in the first direction; and the strip-shaped bottom surface has a plurality of second adhesive disposing regions arranged in the first direction.

Preferably, the case has a strip-shaped wall portion for separating the lens accommodating portion from the light source accommodating portion; and the strip-shaped bottom surface is located in the second direction in a manner of being clamped between the strip-shaped wall portion and the strip-shaped plane.

Preferably, the first adhesive disposing cavity is disposed on the strip-shaped wall portion, is concave in a manner of being away from the lens array in the second direction, and is coated with the first adhesive; and the second adhesive is coated in the first adhesive disposing cavity in a manner covering the first adhesive.

Preferably, the strip-shaped bottom surface has a central strip-shaped bottom surface vertical to the third direction, a first inclined surface clamped between the central strip-shaped bottom surface and the strip-shaped plane in the second direction, and a second inclined surface clamped between the central strip-shaped bottom surface and the strip-shaped wall portion in the second direction; and the first inclined surface and the second inclined surface are inclined in a manner of being further away from each other if they are further away from the central strip-shaped bottom surface in the third direction.

Preferably, the second adhesive is coated on the central strip-shaped bottom surface, the first inclined surface, and the second inclined surface.

Preferably, the strip-shaped plane is vertical to the third direction.

Preferably, the first adhesive is ultraviolet curable resin or an instant adhesive, and the second adhesive is silicone resin or epoxy resin.

A method for manufacturing an image reading device according to a second embodiment of the present invention, the image reading device includes an optical part extending long in a first direction, a case having an accommodating portion for accommodating the optical part, and a light receiving component accommodated in the case, includes: a first adhering step of using a first adhesive to fix the optical part in the accommodating portion; and a second adhering step of using a second adhesive with hardening time longer than that of the first adhesive to fix the optical part in the accommodating portion.

In a preferred embodiment, the optical part includes a lens array enabling light to converge on the light receiving component; the accommodating portion includes a lens accommodating portion for accommodating the lens array; the first adhering step includes a step of coating the first adhesive and a step of hardening the first adhesive; the second adhering step includes a step of coating the second adhesive; a step of embedding the lens array into the lens accommodating portion disposed in the case is performed before the step of hardening the first adhesive, and the step of coating the second adhesive is performed after the step of hardening the first adhesive.

Preferably, the image reading device has a plurality of cavities, adjacent to the lens accommodating portion in a second direction orthogonal to the first direction and concave in a manner of being away from the lens array in the second direction; in the step of coating the first adhesive, the first adhesive is coated in any of the cavities; and in the step of coating the second adhesive, the second adhesive is coated in each of the cavities.

Preferably, the first adhesive is ultraviolet curable resin, and the second adhesive is silicone resin or epoxy resin; and the step of hardening the first adhesive includes a step of irradiating an ultraviolet ray.

In another preferred embodiment, the first adhesive is an instant adhesive, and the second adhesive is silicone resin or epoxy resin.

In a preferred embodiment, the optical part includes a linear light source extending long in the first direction; the accommodating portion includes a light source accommodating portion for accommodating the linear light source; the first adhering step includes a step of coating the first adhesive on the light source accommodating portion and a step of hardening the first adhesive coated on the light source accommodating portion; the second adhering step includes a step of coating the second adhesive on the light source accommodating portion; and a step of embedding the linear light source into the light source accommodating portion is performed before the step of hardening the first adhesive coated on the light source accommodating portion and after the step of coating the second adhesive on the light source accommodating portion.

Preferably, the step of coating the first adhesive on the light source accommodating portion is performed after the step of embedding the linear light source into the light source accommodating portion.

Preferably, the first adhesive is ultraviolet curable resin, and the second adhesive is silicone resin or epoxy resin; and the step of hardening the first adhesive coated on the light source accommodating portion includes a step of irradiating an ultraviolet ray on the light source accommodating portion.

In another preferred embodiment, the first adhesive is an instant adhesive, and the second adhesive is silicone resin or epoxy resin.

Preferably, the light source accommodating portion has a strip-shaped bottom surface overlapping with the linear light source when viewed from a third direction orthogonal to the first direction and the second direction, and a strip-shaped plane adjacent to the strip-shaped bottom surface in the second direction and not overlapping with the linear light source when viewed from the third direction; in the step of coating the first adhesive on the light source accommodating portion, the first adhesive is coated on the strip-shaped plane; and in the step of coating the second adhesive on the light source accommodating portion, the second adhesive is coated on the strip-shaped bottom surface.

According to the manufacturing method, the optical part is fixed in the accommodating portion by using the first adhesive having shorter hardening time before the hardening of the second adhesive. Therefore, when the image reading device is manufactured, it is unnecessary to wait for complete hardening of the second adhesive. Therefore, according to the method for manufacturing the image reading device of the present invention, the delay necessitated by ceasing operation can be reduced, thereby improving manufacturing efficiency.

Other features and advantages of the present invention will become more understood from the following detailed description with reference to the accompanying drawings.

DETAILED DESCRIPTION OF THE INVENTION

Preferred embodiments of the present invention are described in detail below with reference to the accompanying drawings.

Figure 1:
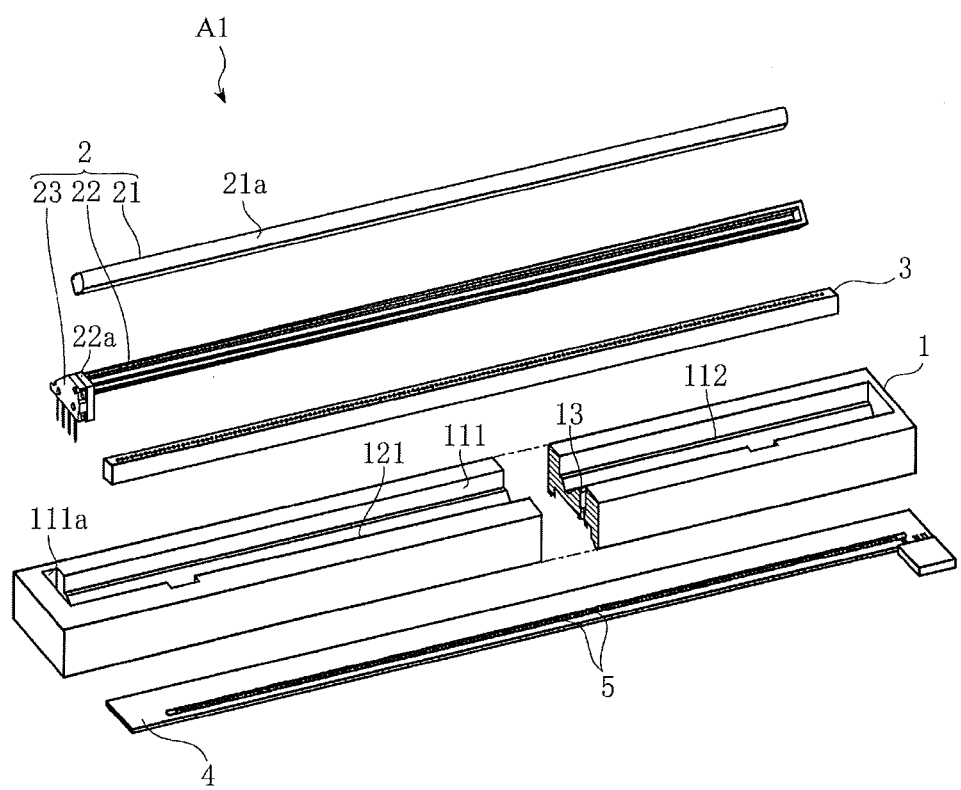
FIG. 1 is an exploded perspective view of an image reading device according to a first embodiment of the present invention.
Figure 2:
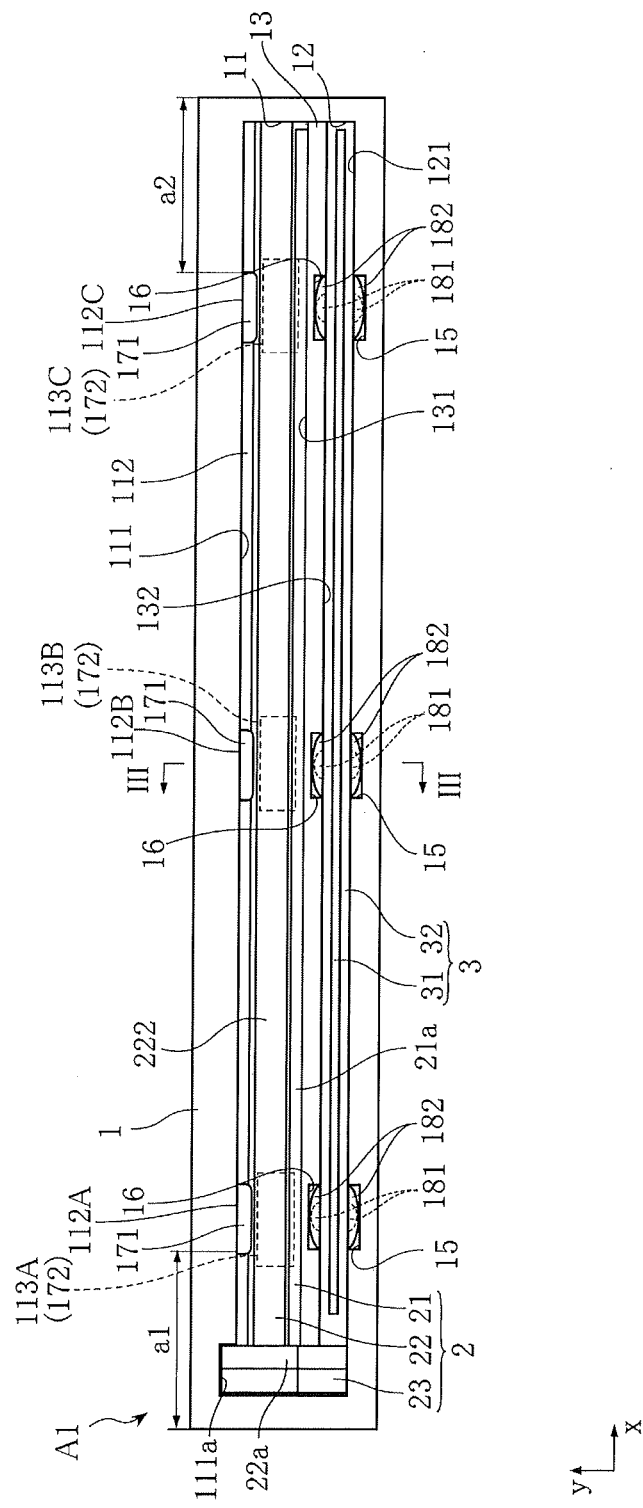
FIG. 2 is a plan view of the image reading device shown in FIG. 1.
Figure 3:
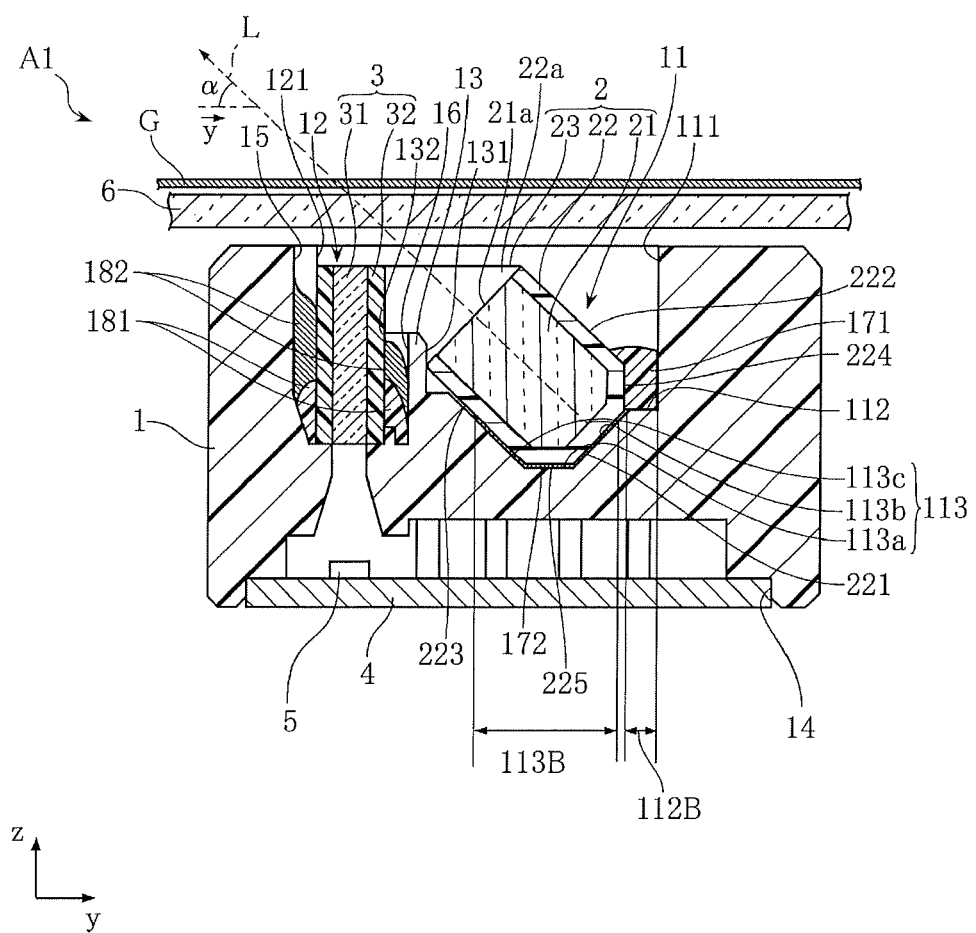
FIG. 3 is a sectional view along Line III-III of FIG. 2.

FIGS. 1-3 show an image reading device according to a first embodiment of the present invention. As shown in FIG. 1 and FIG. 2, the image reading device A1 includes a case 1, a linear light source 2, a lens array 3, a substrate 4, and a light receiving component 5. The image reading device A1 is installed into, for example, a copy machine for use. As shown in FIG. 3, the image reading device A1 is formed to read an original manuscript G carried on a glass cover 6. The glass cover 6 is disposed on a casing of the copy machine having the image reading device A1 installed therein. Moreover, a main scanning direction of the image reading device A1 is set to an x direction, and an auxiliary scanning direction is set to a y direction. A z direction is a direction orthogonal to the x and y directions.

The case 1 is made of, for example, black resin and formed to be of a cuboid shape extending long in the x direction. As an example, the size of the case 1 is 230 mm in the x direction, 14 mm in the y direction, and 14 mm in the z direction. The linear light source 2 and the lens array 3 are accommodated between an inner wall surface 111 on one side of the case 1 in the y direction and an inner wall surface 121 on the other side of the case 1 in the y direction. A strip-shaped wall portion 13 is disposed between the inner wall surface 111 and the inner wall surface 121. An inner wall surface 111a closer to a side in the y direction than the inner wall surface 111 is disposed near an end portion of the case 1 in the x direction. No strip-shaped wall portion 13 is disposed between the inner wall surface 111a and the inner wall surface 121.

A portion in the case 1 for accommodating the linear light source 2 is disposed as a light source accommodating portion 11. The light source accommodating portion 11 is mainly a portion clamped between a side surface 131 on one side of the strip-shaped wall portion 13 in the y direction and the inner wall surface 111. Moreover, a base 22a and a light source unit 23 are accommodated between the inner wall surface 111a and the inner wall surface 121. The light source accommodating portion 11 is also between the inner wall surface 111a and the inner wall surface 121.

A portion in the case 1 for accommodating the lens array 3 is disposed as a lens accommodating portion 12. The lens accommodating portion 12 is a portion clamped between a side surface 132 on the other side of the strip-shaped wall portion 13 in the y direction and the inner wall surface 121.

Furthermore, as shown in FIG. 3, the case 1 has an opening portion 14 open to the lower part of FIG. 3 in the z direction. The substrate 4 is embedded into the opening portion 14. The light receiving component 5 is disposed on the substrate 4. The light receiving component 5 is formed by a plurality of photoelectric conversion elements arranged in a row in the x direction.

As shown in FIG. 1, the linear light source 2 includes a light guiding body 21 extending long in the x direction, a white case 22 for accommodating the light guiding body 21, and a light source unit 23 for providing light for the light guiding body 21. As shown in FIG. 3, the linear light source 2 is formed so that a light emitting portion 21a of the light guiding body 21 mainly emits strip-shaped light extending long in the x direction toward a light emitting direction L. The linear light source 2 is fixed in the light source accommodating portion 11 of the case 1 in a state of inclining at an angle α between the light emitting direction L and the y direction. As an example, the angle α is 40 degrees. The linear light source 2 is fixed in the light source accommodating portion 11 by using a first adhesive 171 and a second adhesive 172.

The light guiding body 21 is made of, for example, acrylic resin and formed to be of a rod shape extending in the x direction. In the light emitting direction L of the light guiding body 21, concave/convex portions are formed on a surface opposite to the light emitting portion 21a. Through the concave/convex portions, a part of light going forward inside the light guiding body 21 in the x direction is scattered and emitted from the light emitting portion 21a to the outside of the light guiding body 21. The size of the light guiding body 21 is, for example, 224.5 mm in the x direction.

As shown in FIG. 3, the white case 22 is formed by spreading over substantially the whole length other than two end portions in the x direction so that a side in the light emitting direction L is open. The white case 22 includes a bottom surface 221 on the other side in the light emitting direction L and side surfaces 222 and 223 orthogonal to the bottom surface 221. Furthermore, the white case 22 includes a connecting side surface 224 for connecting the bottom surface 221 and the side surface 222 and a connecting side surface 225 for connecting the bottom surface 221 and the side surface 223. In the example shown in FIG. 3, the connecting side surface 224 becomes a surface vertical to the y direction, and the connecting side surface 225 becomes a surface vertical to the z direction.

Furthermore, an end of the white case 22 in the x direction has a base 22a. The light source unit 23 is fixed on the base 22a. The base 22a has a window portion penetrating in the x direction and not shown. Three LED chips are built into the light source unit 23. Viewing from the x direction, the LED chips are disposed on a position overlapping with the window portion. Light from the LED chips is incident to the light guiding body 21 through the window portion. The number of LED chips is an example and can be appropriately changed according to the specification. For example, in addition to LED chips emitting red, blue, and green light, an LED chip emitting an infrared ray can be disposed. In addition, a combination of an LED chip emitting white light and the LED chip emitting the infrared ray can also be disposed.

In order to smoothly accommodate the linear light source 2, the light source accommodating portion 11 has a strip-shaped plane 112 disposed along the inner wall surface 111; and a strip-shaped bottom surface 113, clamped between the strip-shaped plane 112 and the strip-shaped wall portion 13 in the y direction. In the example shown in FIG. 3, the inner wall surface 111 is vertical to the y direction, and faces the connecting side surface 224 of the white case 22. The strip-shaped plane 112 is located between the inner wall surface 111 and the connecting side surface 224 in the y direction and is vertical to the z direction. A portion of the white case 22 other than the base 22a is disposed on the strip-shaped bottom surface 113. The strip-shaped bottom surface 113 has a central strip-shaped bottom surface 113a vertical to the z direction, a first inclined surface 113b configured on one side of the central strip-shaped bottom surface 113a in the y direction, and a second inclined surface 113c configured on the other side of the central strip-shaped bottom surface 113a. The first inclined surface 113b is inclined in a manner of it is further away from the central strip-shaped bottom surface 113a in the z direction if it is closer to a side in FIG. 3 in the y direction. The second inclined surface 113c is inclined in a manner of being further away from the central strip-shaped bottom surface 113a in the z direction if it is closer to another side in FIG.

3 in the y direction. The central strip-shaped bottom surface 113a supports the connecting side surface 225 of the white case 22. The first inclined surface 113b supports the bottom surface 221 of the white case 22. The second inclined surface 113c supports the side surface 223 of the white case 22.

As shown in FIG. 2, three first adhesive disposing regions 112A, 112B, and 112C arranged in the x direction are disposed on the strip-shaped plane 112. Each of the first adhesive disposing regions 112A, 112B, and 112C is formed with a size viewed from the z direction being 10 mm and a size viewed from the y direction being 2 mm. The first adhesive disposing region 112A is located in a position of the strip-shaped plane 112 close to one end portion in the x direction. Specifically, a distance a1 between one end portion of the first adhesive disposing region 112A in the x direction and one end portion of the case 1 in the x direction is 15 mm. The first adhesive disposing region 112B is located in the center of the strip-shaped plane 112 in the x direction. The first adhesive disposing region 112C is located in a position of the strip-shaped plane 112 close to the other end portion in the x direction. A distance a2 between the other end portion of the first adhesive disposing region 112C in the x direction and the other end portion of the case 1 in the x direction is the same as the distance a1. The size is a preferred example and can be appropriately changed. Moreover, the distance a1 and the distance a2 can also be set to different lengths.

The first adhesive 171 is coated on the first adhesive disposing regions 112A, 112B, and 112C. As shown in FIG. 3, the first adhesive 171 is coated in a manner filling a cavity formed by the inner wall surface is 111, the strip-shaped plane 112, and the connecting side surface 224. A part of the first adhesive 171 is attached on the side surface 222. The first adhesive 171 is ultraviolet curable resin.

Furthermore, three second adhesive disposing regions 113A, 113B, and 113C arranged in the x direction are disposed on the strip-shaped bottom surface 113. Each of the second adhesive disposing regions 113A, 113B, and 113C is formed with a size viewed from the z direction being 12 mm and a size viewed from the y direction being 4 mm. As shown in FIG. 3, in addition to the whole width of the central strip-shaped bottom surface 113a in the y direction, the adhesive disposing region 113B spreads over a part of the first and second inclined surfaces 113b and 113c. Although not shown, the same case occurs in the adhesive disposing regions 113A and 113C.

Moreover, the second adhesive disposing region 113A is located in the same position as the first adhesive disposing region 112A in the y direction. The second adhesive disposing region 113B is located in the same position as the first adhesive disposing region 112B in the y direction. The second adhesive disposing region 113C is located in the same position as the first adhesive disposing region 112C in the y direction.

The second adhesive 172 is coated on the second adhesive disposing regions 113A, 113B, and 113C. The second adhesive 172 allows the central strip-shaped bottom surface 113a to adhere to the connecting side surface 225, the first inclined surface 113b to adhere to the bottom surface 221, and the second inclined surface 113c to adhere to the side surface 223. The second adhesive 172 is silicone resin.

The lens array 3 includes a lens member 31 and a lens bracket 32 for holding the lens member 31, so that light from the original manuscript G converges on the light receiving component 5. The lens member 31 is formed by a plurality of cylindric lenses arranged in the x direction. The lens bracket 32 is made of, for example, resin and formed to be of the cuboid shape extending long in the x direction. A side surface of the lens bracket 32 on a side in the y direction is connected to the side surface 132 of the strip-shaped wall portion 13 on the other side. A side surface of the lens bracket 32 on the other side in the y direction is connected to the inner wall surface 121.

The lens array 3 is fixed in the lens accommodating portion 12 by using a first adhesive 181 and a second adhesive 182. The first adhesive 181 is ultraviolet curable resin. The second adhesive 182 is silicone resin.

The case 1 includes three pairs of adhesive disposing cavities 15 and 16 coated with the first adhesive 181 and the second adhesive 182. The concave adhesive disposing portion 15 is formed along the inner wall surface 121. The concave adhesive disposing portion 16 is formed on the strip-shaped wall portion 13 and along the side surface 132. As shown in FIG. 2, one pair of the three pairs of adhesive disposing cavities 15 and 16 is disposed in the center of the case 1 in the x direction. The remaining two pairs are disposed near two ends of the case 1 in the x direction, respectively. Specifically, intervals between the pair of adhesive disposing cavities 15 and 16 located in the center and the other two pairs of adhesive disposing cavities 15 and 16 are 90 mm. Moreover, the first adhesive 181 is denoted with a dashed line in FIG. 2 for convenience of description.

As shown in FIG. 3, the adhesive disposing cavities 15 and 16 are concave in a manner of being away from the lens array 3 in the y direction. The first adhesive 181 is coated on the adhesive disposing cavities 15 and 16 in the lower part of the FIG. 3 in the z direction. The second adhesive 182 is filled between the adhesive disposing cavities 15 and 16 and the lens bracket 32 in a manner covering the first adhesive 181.

Moreover, in this embodiment, the first adhesive 181 is coated on the three pairs of adhesive disposing cavities 15 and 16, but the first adhesive 181 can also be coated on only three sites of the three pairs of adhesive disposing cavities 15 and 16. For example, the first adhesive 181 can be coated on only the adhesive disposing cavities 15 or only the adhesive disposing cavities 16. Moreover, the first adhesive 181 can be coated on the adhesive disposing cavities 15 at two ends and the adhesive disposing cavities 16 at two ends, and the second adhesive 182 coated only on the central adhesive disposing cavities 15 and 16. Alternatively, the first adhesive 181 can be coated on the adhesive disposing cavities 16 at two ends and the central concave adhesive disposing portion 15, and the second adhesive 182 coated only on other adhesive disposing cavities 15 and 16.

Referring to FIGS. 4-12, an example of a preferred method for manufacturing the image reading device A1 is described.

The case 1 can be made, for example, by molding resin with a mould. The pre-assembled linear light source 2 and lens array 3 are installed in the case 1 to manufacture the image reading device A1.

Figure 4:
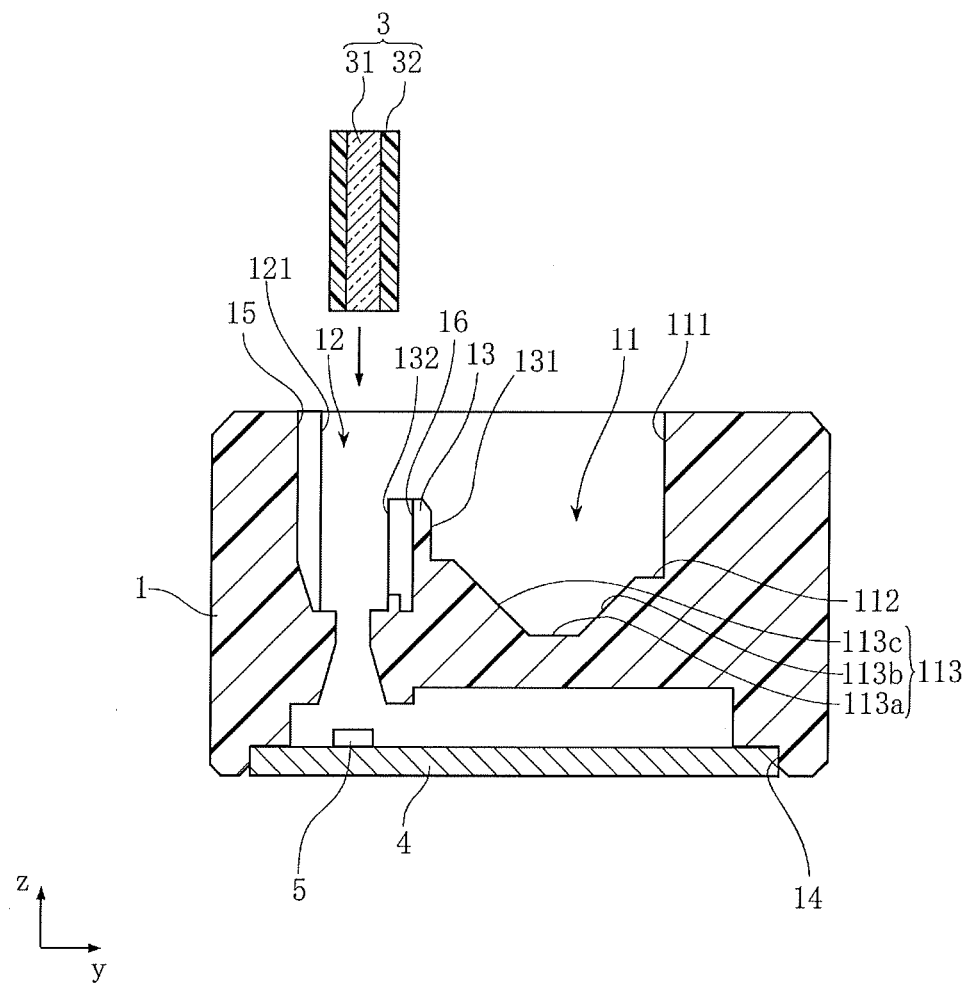
FIG. 4 shows a part of steps of manufacturing the image reading device shown in FIG. 1.

First, as shown in FIG. 4, a step of embedding the lens array 3 into the lens accommodating portion 12 is performed. The step is performed by inserting the lens array 3 between the inner wall surface 121 and the side surface 132 from an upper part of FIG. 4 in the z direction. Also in this step, a position of the lens array 3 in the x direction is adjusted. Specifically, the other end portion of the lens array 3 in the x direction is connected to the other end portion of the lens accommodating portion 12 in the x direction.

Figure 5:
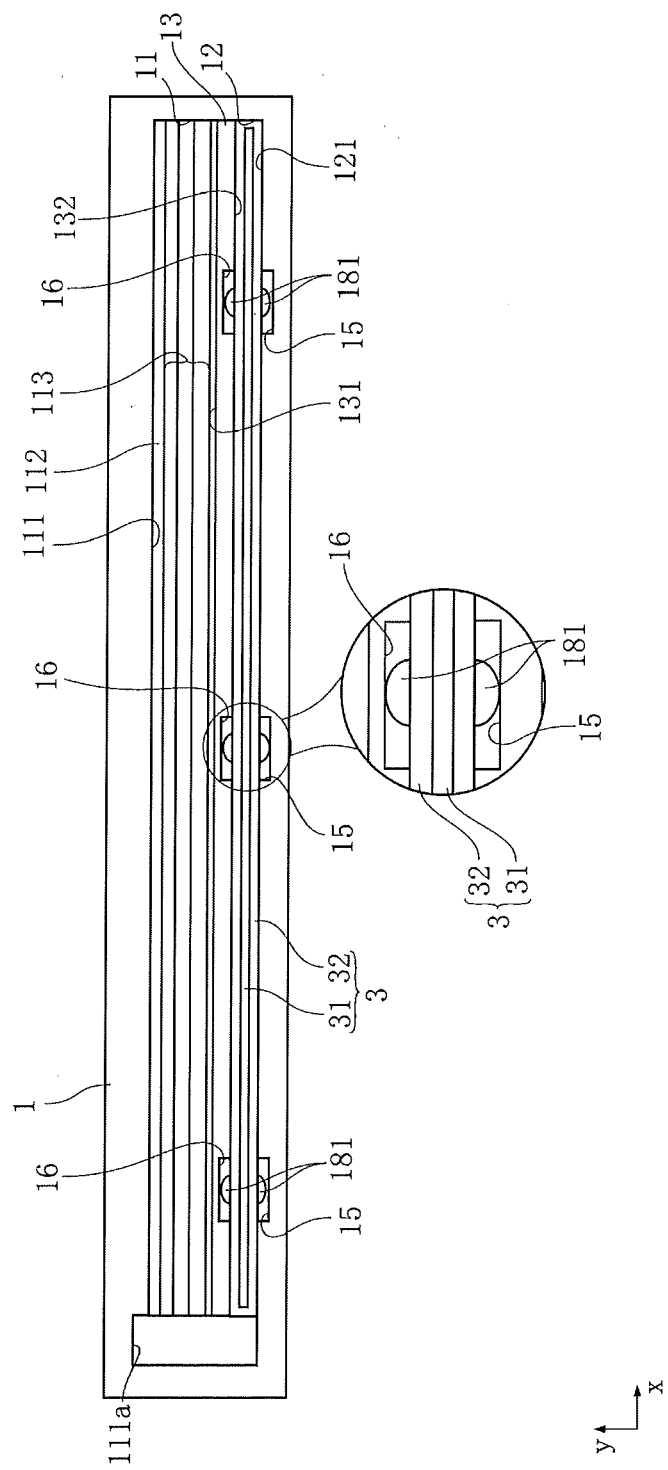
FIG. 5 shows a step after the step shown in FIG. 4.

As shown in FIG. 5, the step of coating the first adhesive 181 on the three pairs of adhesive disposing cavities 15 and 16 is performed. In FIG. 5, for convenience of description, one pair of adhesive disposing cavities 15 and 16 is enlarged. As shown in the enlarged portion of the FIG. 5, the first adhesive 181 is disposed in the centers of the adhesive disposing cavities 15 and 16 in the x direction. In this way, the first adhesive 181 can be coated on only three sites of the three pairs of adhesive disposing cavities 15 and 16. In this step, the first adhesive 181 is in an unhardened state.

Figure 6:
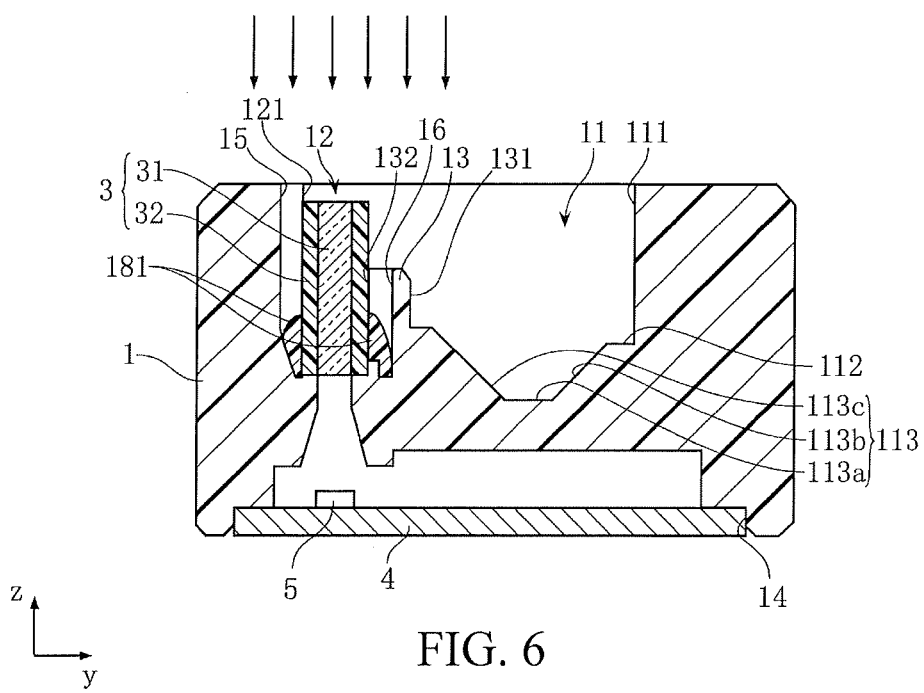
FIG. 6 shows a step after the step shown in FIG. 5.

The step of hardening the first adhesive 181 is performed. As shown in FIG. 6, the step is performed by irradiating an ultraviolet ray from the upper part of FIG. 6 in the z direction. The ultraviolet ray is emitted for 20 seconds. The first adhesive 181 is ultraviolet curable resin, so through this step, the first adhesive 181 is hardened, so that the lens array 3 is fixed in a position specified in the foregoing step.

Figure 7:
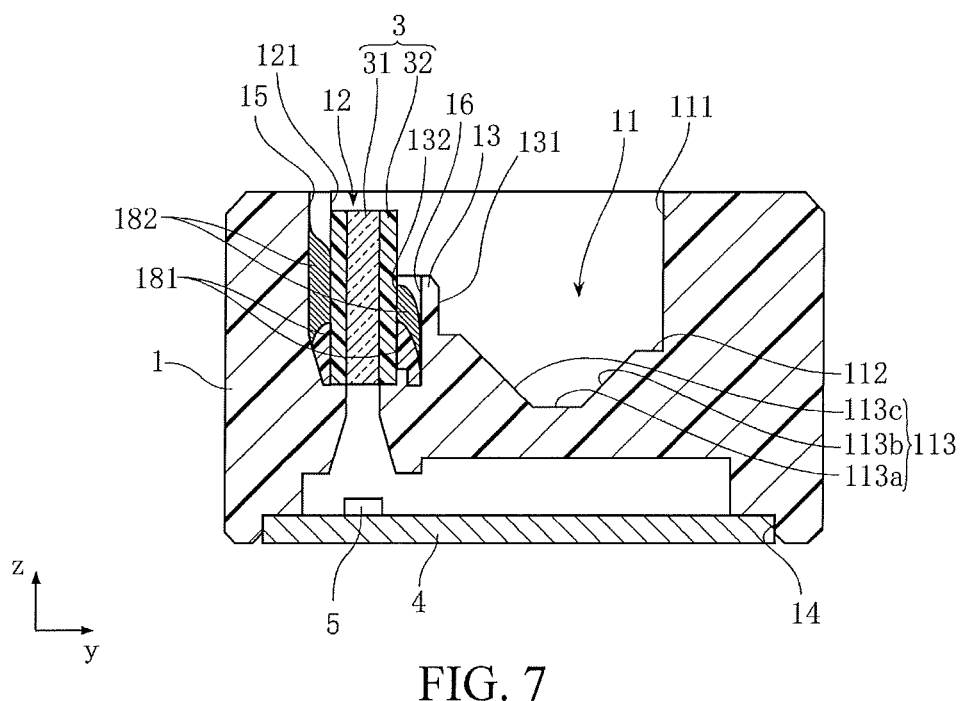
FIG. 7 shows a step after the step shown in FIG. 6.

As shown in FIG. 7, the step of coating the second adhesive 182 on the three pairs of adhesive disposing cavities 15 and 16 is performed. The second adhesive 182 is silicone resin. Twenty-four hours is required to completely harden the silicone resin. In this embodiment, in the foregoing step, the lens array 3 is fixed by using the first adhesive 181, so it is not necessary to wait for the second adhesive 182 to harden.

Figure 8:
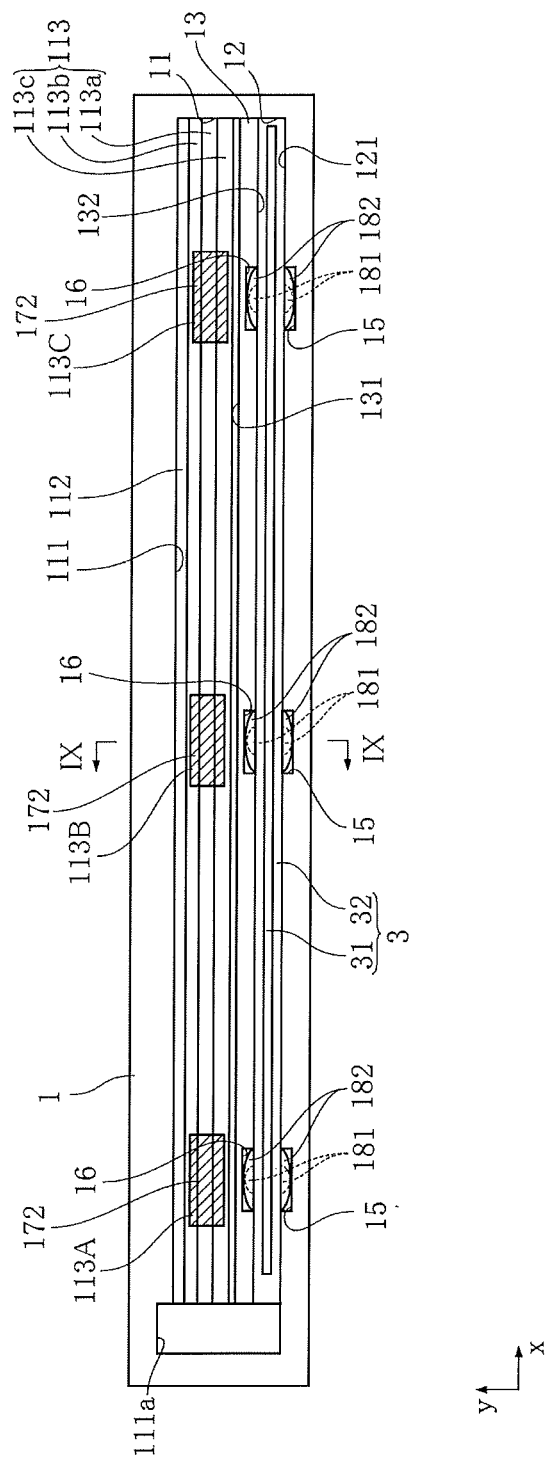
FIG. 8 shows a step after the step shown in FIG. 7.
Figure 9:
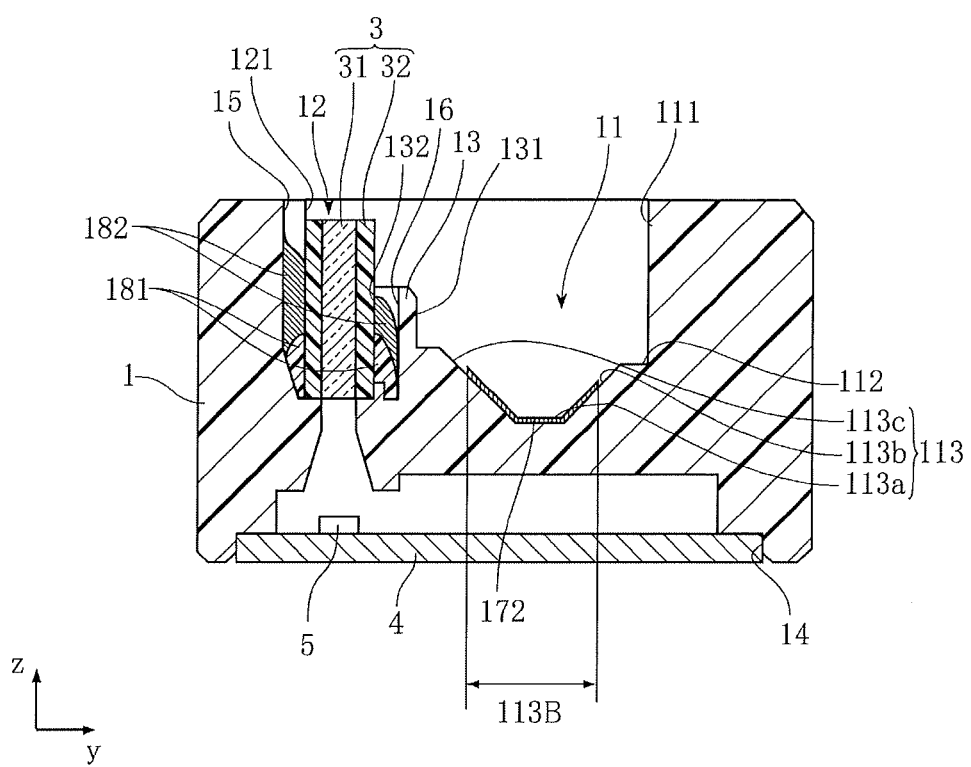
FIG. 9 is a sectional view along Line IX-IX of FIG. 8.

As shown in FIG. 8 and FIG. 9, the step of coating the second adhesive 172 on the second adhesive disposing regions 113A, 113B, and 113C is performed. In FIG. 8, the second adhesive disposing regions 113A, 113B, and 113C are denoted by oblique lines.

Figure 10:
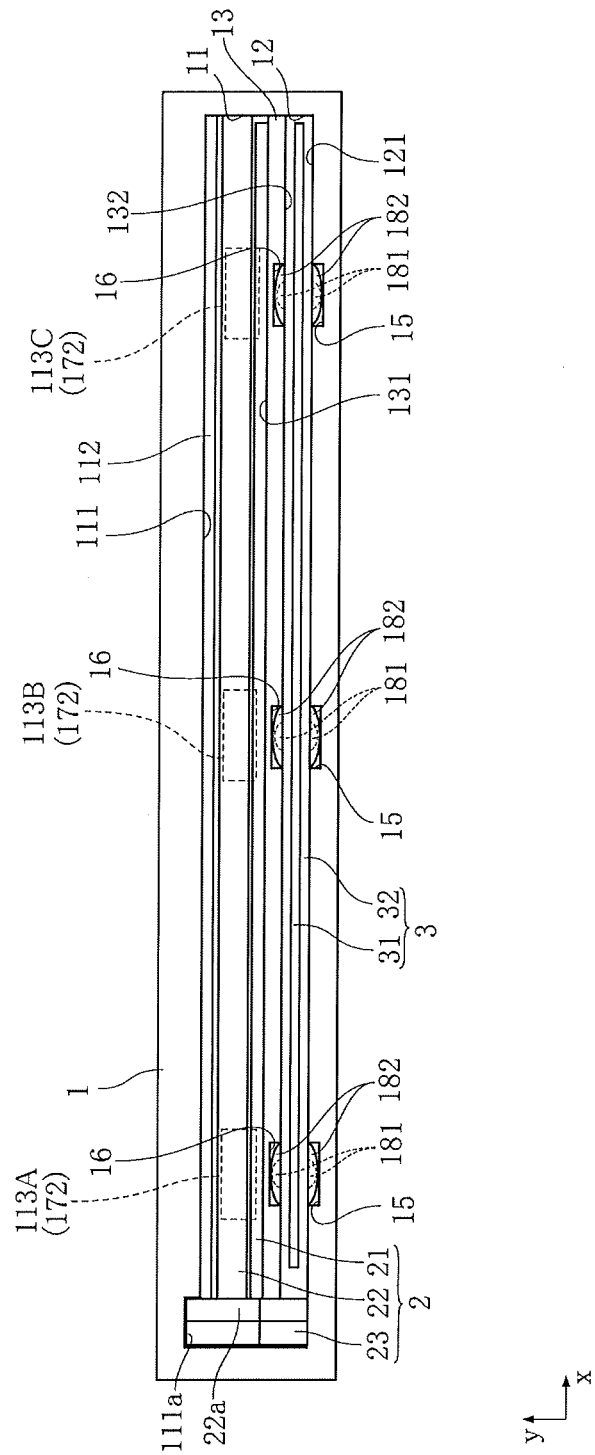
FIG. 10 shows a step after the step shown in FIG. 8.

The step of embedding the linear light source 2 into the light source accommodating portion 11 is performed. FIG. 10 shows a plan view obtained after the linear light source 2 is embedded into the light source accommodating portion 11. In this step, a position of the linear light source 2 in the x direction is adjusted. Specifically, the position of the linear light source 2 is determined in a manner such that the other end portion of the linear light source 2 in the x direction is connected to the other end portion of the light source accommodating portion 11 in the x direction. The second adhesive 172 is silicone resin. A time, for example, of 24 hours is required to completely harden the silicone resin under normal temperature.

Figure 11:
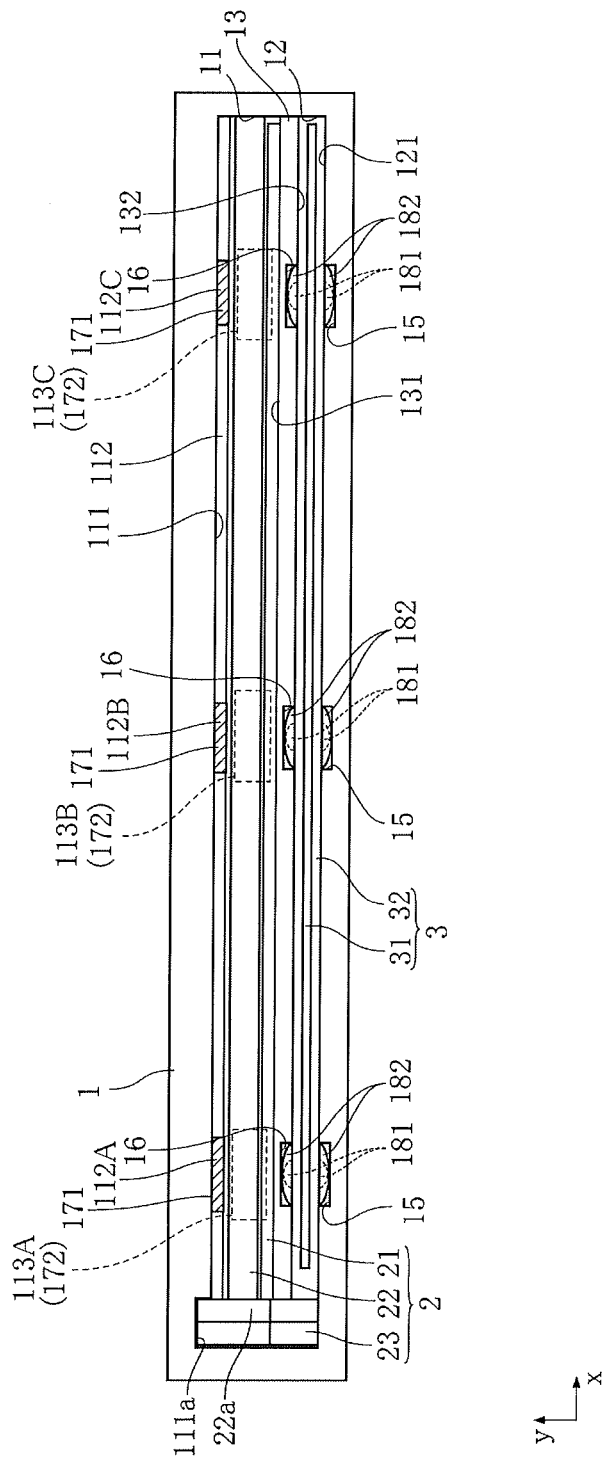
FIG. 11 shows a step after the step shown in FIG. 10.

As shown in FIG. 11, the step of coating the first adhesive 171 on the first adhesive disposing regions 112A, 112B, and 112C is performed. In FIG. 11, the first adhesive disposing regions 112A, 112B, and 112C are denoted by oblique lines.

Figure 12:
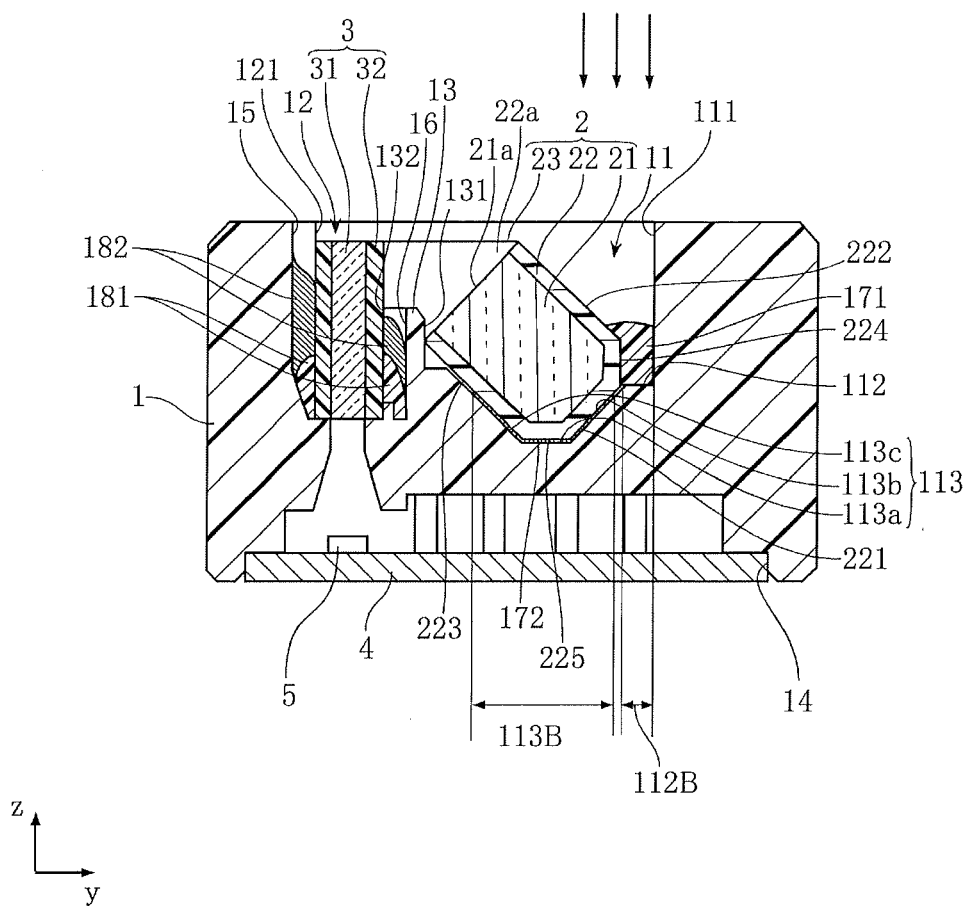
FIG. 12 shows a step after the step shown in FIG. 11.

The step of hardening the first adhesive 171 is performed. As shown in FIG. 12, the step is performed by irradiating the ultraviolet ray towards the strip-shaped plane 112 from an upper part of FIG. 12 in the z direction. The time for irradiating the ultraviolet ray is for example, 20 seconds. The first adhesive 171 is ultraviolet curable resin, which is hardened through this step. Therefore, the linear light source 2 can be fixed in a position specified in the foregoing step without waiting for complete hardening of the second adhesive 172.

Through the foregoing steps, the image reading device A1 shown in FIGS. 1-3 can be manufactured. An operation for installing the manufactured image reading device A1 into the copy machine is performed. In this way, during the manufacturing of the image reading device A1, the first adhesives 171 and 181 are used to fix the linear light source 2 and the lens array 3. Therefore, the operation for installing the image reading device A1 into the copy machine can be performed without waiting for the hardening of the second adhesives 172 and 182.

Effects of the image reading device A1 are described.

As stated above, during manufacturing, the linear light source 2 of the image reading device A1 is fixed in the light source accommodating portion 11 by using the first adhesive 171 hardened in a short time with ultraviolet irradiation. During manufacturing, the lens array 3 is fixed in the lens accommodating portion 12 by using the first adhesive 181 hardened in a short time with ultraviolet irradiation. Therefore, for the image reading device A1, the time required to cease operation in the manufacturing steps can be reduced. Therefore, the steps for manufacturing the image reading device A1 can be performed more effectively.

In another aspect, the linear light source 2 can also be fixed in the light source accommodating portion 11 by using the second adhesive 172, and the lens array 3 can also be fixed in the lens accommodating portion 12 by using the second adhesive 182. The first adhesives 171 and 181 are hardened quickly, but the strength of the resulting bonding force can become degraded in a high-temperature and wet environment. To obviate this problem, the second adhesives 172 and 182 with higher stability are disposed in the image reading device A1 so that attachment between the linear light source 2 and the lens array 3 is not degraded even in such an adverse environment.

A variation of the image reading device A1 is described below. In this variation, the first adhesives 171 and 172 are ultraviolet curable resin, but the first adhesives 171 and 172 can also be a commercially available instant adhesive. Moreover, the instants adhesive in the specification is an adhesive capable of adhering in about 1 to 2 minutes. The instant adhesive, cyanoacrylate adhesive, can be used, for example. In the case of using an instant adhesive as the first adhesives 171 and 172, the ultraviolet ray does not need to be emitted during the manufacturing of the image reading device A1; instead, it is only necessary to wait for the first adhesives 171 and 172 to harden.

Although in the example, the second adhesives 172 and 182 are silicone resin, the second adhesives 172 and 182 can alternatively be epoxy resin.

FIGS. 13-17 show an image reading device according to another embodiment of the present invention. In the figures, the same elements or similar ones to those in the embodiment are designated by the same reference numbers as those in the embodiment, with the description of these elements appropriately omitted.

Figure 13:
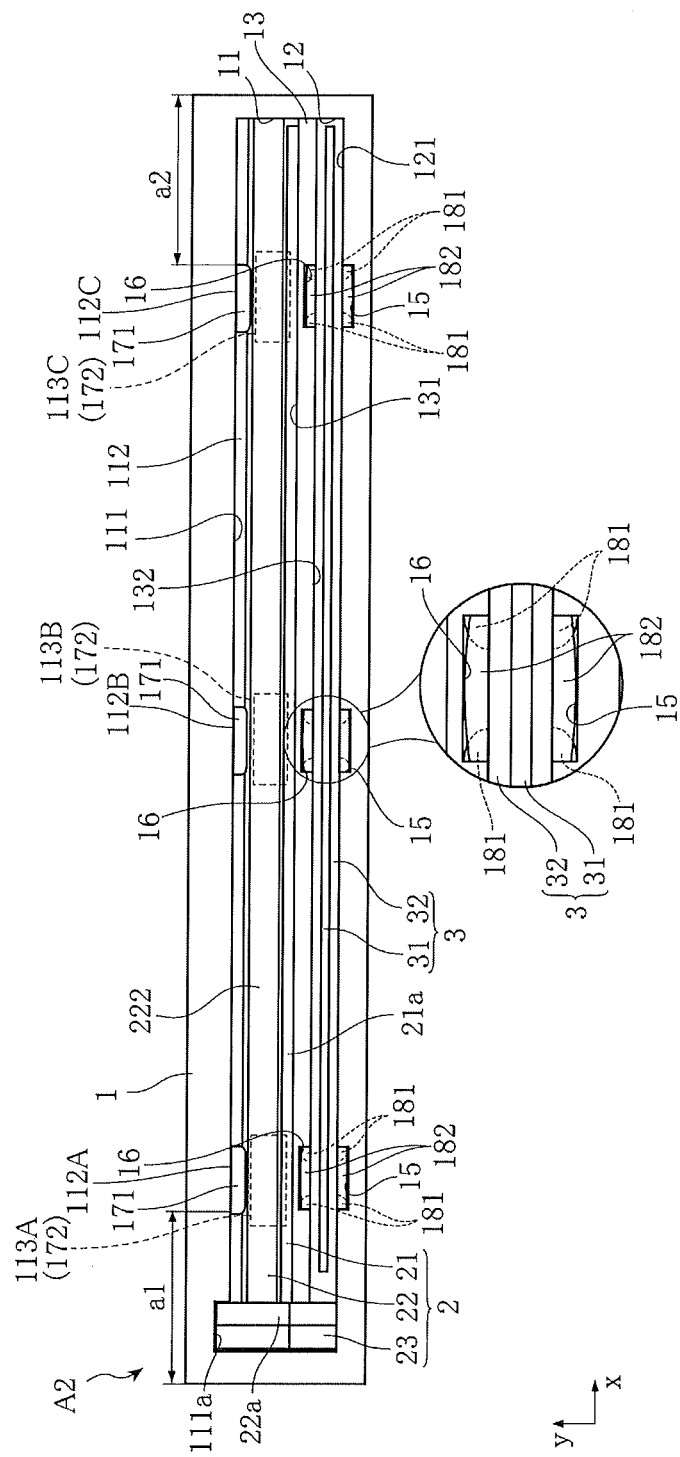
FIG. 13 is a plan view of an image reading device according to a second embodiment of the present invention.

FIG. 13 shows an image reading device according to a second embodiment of the present invention. The difference between the image reading device A2 shown in FIG. 13 and the image reading device A1 lies in positions of the first adhesives 181 and the second adhesives 182 of the three pairs of adhesive disposing cavities 15 and 16; otherwise the formation is the same as that of the image reading device A1. In FIG. 13, for convenience of description, one pair of adhesive disposing cavities 15 and 16 is enlarged.

In this embodiment, as shown in the enlarged portion of FIG. 13, the first adhesive 181 is coated on two end portions of each of the adhesive disposing cavities 15 and 16 in the x direction. The second adhesive 182 is coated by filling the adhesive disposing cavities 15 and 16.

In the image reading device A2 (like the image reading device A1), during manufacturing, the lens array 3 is fixed in the lens accommodating portion 12 by using the first adhesive 181 hardened in a short time with ultraviolet irradiation. Therefore, for the image reading device A2, the time required to cease operation in the manufacturing steps can be reduced. Therefore, the steps for manufacturing the image reading device A2 can be performed more effectively.

Figure 14:
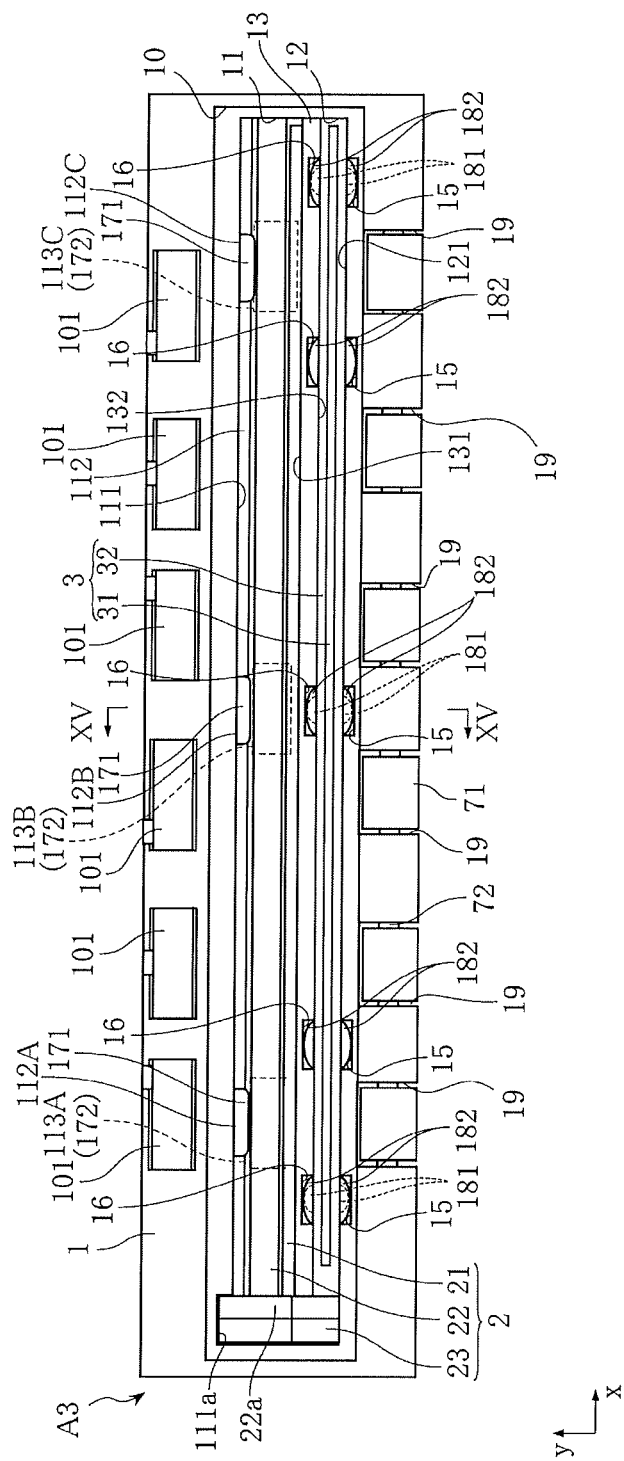
FIG. 14 is a plan view of an image reading device according to a third embodiment of the present invention.
Figure 15:
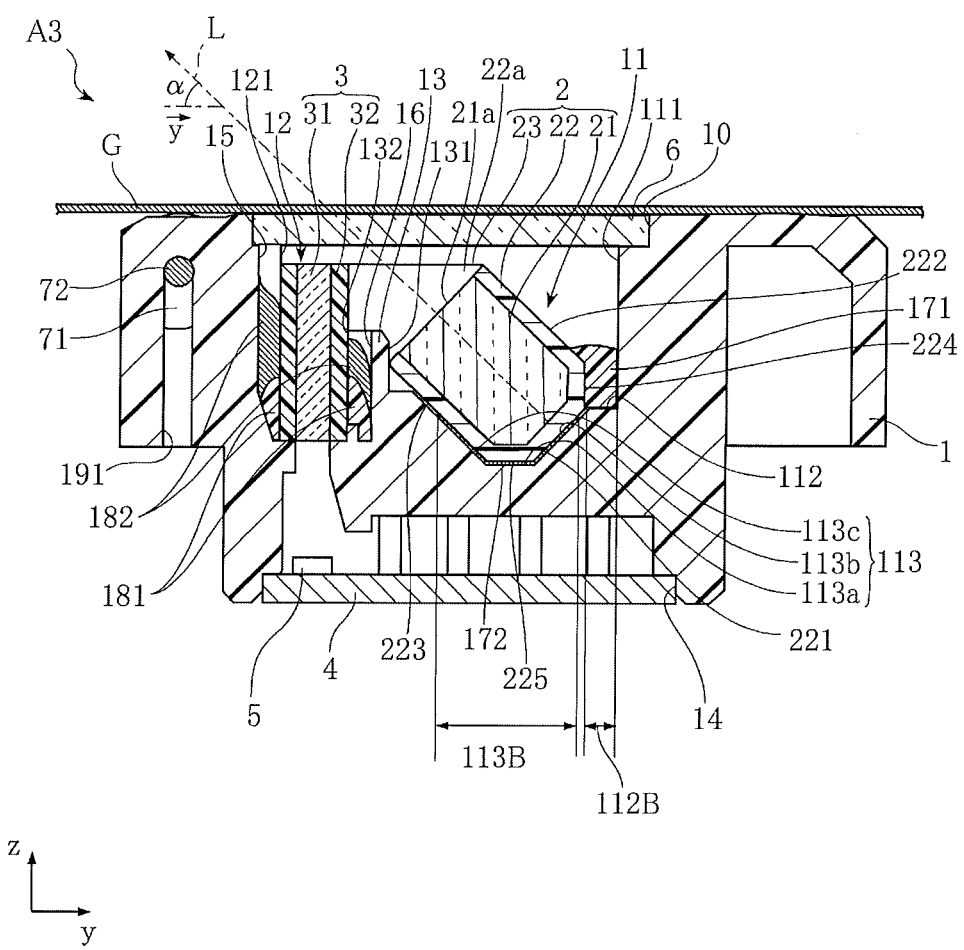
FIG. 15 is a sectional view along Line XV-XV of FIG. 14.

FIG. 14 and FIG. 15 show an image reading device according to a third embodiment of the present invention. In the image reading device A3 shown in FIG. 14 and FIG. 15, a glass cover 6 is installed on the case 1. The case 1 has an opening portion 10 in an upper end portion in FIG. 15 in a z direction, and the glass cover 6 is accommodated in the opening portion 10. Furthermore, the image reading device A3 can be used in combination with a rotating roller 71 for moving an original manuscript G. Therefore, as shown in FIG. 14, one side of the case 1 in a y direction has a plurality of guiding members 101 for guiding the original manuscript G, and the other side of the case 1 in the y direction has a plurality of cavities 19 engaged with the rotating roller 71. The rotating roller 71 is supported by a rotating shaft 72. As shown in FIG. 15, the case 1 has a groove portion 191 for accommodating the rotating shaft 72. The groove portion 191 is formed with an opening in a lower part of FIG. 14 in the z direction, and the rotating shaft 72 can be inserted through the opening.

As shown in FIG. 14, the case 1 of the image reading device A3 has five pairs of adhesive disposing cavities 15 and 16. A first adhesive 181 is coated on three pairs of adhesive disposing cavities 15 and 16 disposed on the center and two ends in an x direction. A second adhesive 182 is only coated on the remaining two pairs of adhesive disposing cavities 15 and 16.

In the image reading device A3, the adhesive disposing cavities 15 and 16 are each additionally disposed and coated with the second adhesive 182, so that a lens array 3 can be fixed more firmly. Moreover, the effect of the first adhesive 181 is fixing a position of the lens array 3 before the hardening of the second adhesive 182. It is not necessary to coat the first adhesive 181 on the additional adhesive disposing cavities 15 and 16.

Figure 16:
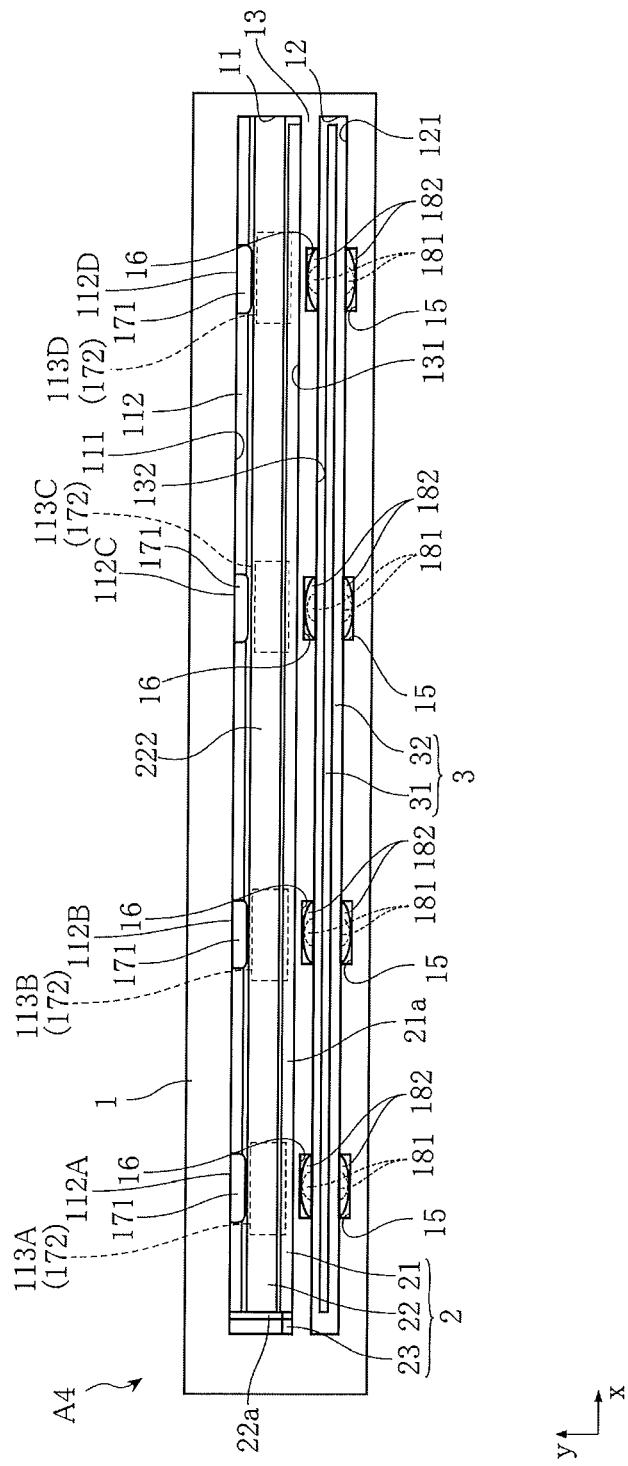
FIG. 16 is a plan view of an image reading device according to a fourth embodiment of the present invention.

FIG. 16 shows an image reading device according to a fourth embodiment of the present invention. The difference between the image reading device A4 shown in FIG. 16 and the image reading device A1 lies in the shape of the case 1; the formation is otherwise the same as that of the image reading device A1. In the case 1 of this embodiment, the light source accommodating portion 11, the lens accommodating portion 12, and the strip-shaped wall portion 13 have the same length in the x direction. Therefore, the inner wall surface 111 and the side surface 131 spread over the whole length in the x direction and are opposite to each other. Furthermore, as shown in FIG. 16, the case 1 of this embodiment includes four pairs of adhesive disposing cavities 15 and 16, first adhesive disposing regions 112A, 112B, 112C, and 112D, and second adhesive disposing regions 113A, 113B, 113C, and 113D.

A second adhesive 181 and a second adhesive 182 are coated on each of the four pairs of adhesive disposing cavities 15 and 16. Moreover, the first adhesive 181 is coated on the adhesive disposing cavities 15 and 16 at two ends in the x direction, and no first adhesive 181 is coated on the two pairs of adhesive disposing cavities 15 and 16 in the center.

As shown in FIG. 4, the first adhesive disposing regions 112A, 112B, 112C, and 112D and the second adhesive disposing regions 113A, 113B, 113C, and 113D are arranged sequentially in the x direction. This formation is effective in the case where a linear light source 2 longer than the linear light source 2 of the image reading device A1 in the x direction is fixed on the case 1.

Figure 17:
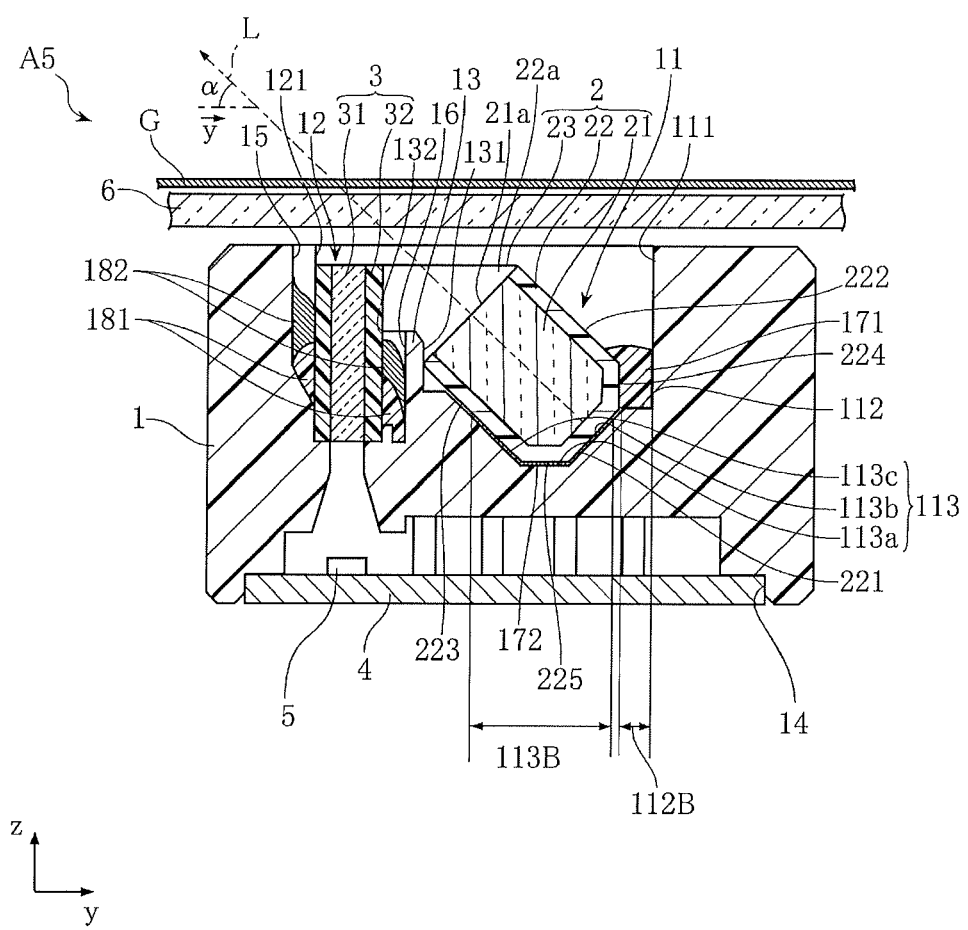
FIG. 17 is a sectional view of an image reading device according to a fifth embodiment of the present invention.
Figure 18:
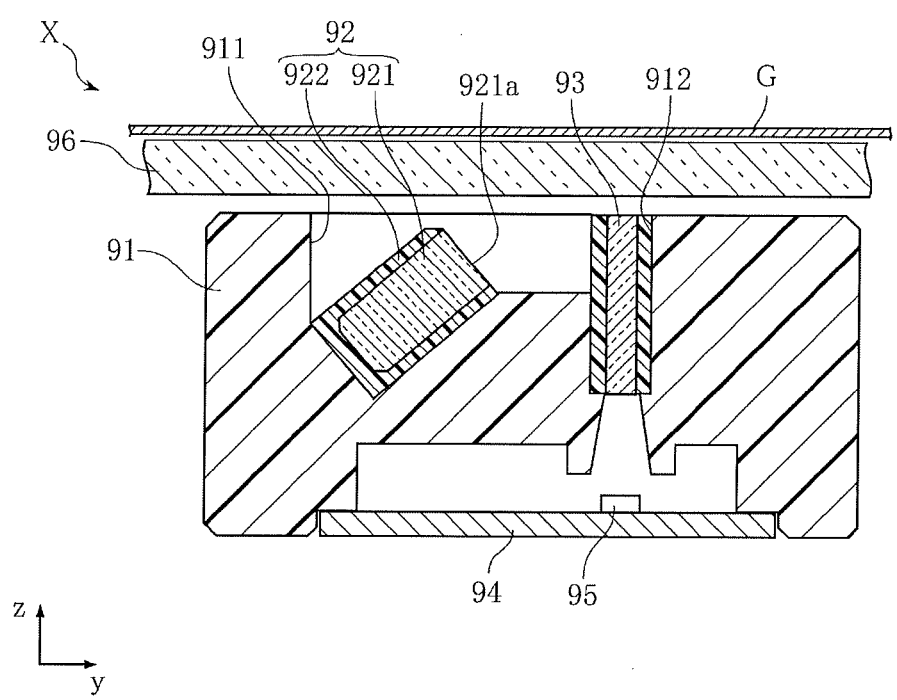
FIG. 18 is a sectional view of an example of a conventional image reading device.

FIG. 17 shows an image reading device according to a fifth embodiment of the present invention. The difference between the image reading device A5 shown in FIG. 17 and the image reading device A1 lies in the shape of the concave adhesive disposing portion 15; the formation is otherwise the same as that of the image reading device A1.

As shown in FIG. 17, the concave adhesive disposing portion 15 of this embodiment is at a lower end in the z direction and is located in a position closer to an upper part of the figure than the lower end of the lens array 3 in the z direction.

The image reading device of the present invention is not limited to the embodiments. The specific formation of parts of the image reading device of the present invention can be designed and changed freely. For example, in the embodiments, the built-in linear light source 2 is formed, but the present invention is also applicable to an image reading device without the linear light source 2 and having only the lens array 3 built therein. Moreover, when the lens array 3 is short in the x direction, it is possible to employ only a pair of adhesive disposing cavities 15 and 16.

Moreover, the formation of each part of the image reading devices A1 to A5 can also be combined. For example, the adhesive disposing cavities 15 in the image reading devices A2 to A4 can also be disposed with the same shape as that of the concave adhesive disposing portion 15 in the image reading devices A5.

In the embodiments, at least the second adhesive 182 is coated on all of the adhesive disposing cavities 15 and 16, but a cavity without the first adhesive 181 and the second adhesive 182 can also be disposed. Alternatively, a concave adhesive disposing portion only coated with the first adhesive 181 can be used.

Also, in the embodiments, the adhesive disposing cavities 15 and 16 are disposed on pairs in the same position in the x direction, but the present invention is not limited to such a formation. For example, the concave adhesive disposing portion can be disposed on only a single side of the lens array 3, or positions of the adhesive disposing cavities on two sides in the x direction can also be different.

Furthermore, the light source unit 23 in the embodiments is disposed on only one side of the white case 22 in the x direction, but the present invention is not limited to such a formation. The present invention is also effective in the case where, for example, the light source unit is configured on two sides in the length direction of the light guiding body.

Finally, in the embodiments, light is emitted from the light emitting portion 21a through the concave/convex portions disposed on the light guiding body 21, but the present invention is not limited to such a formation. The present invention is also effective in the case where, for example, a light guiding body has disposed a reflective pattern through printing.

While several embodiments of the present invention have been illustrated and described, various modifications and improvements can be made by those skilled in the art. The embodiments of the present invention are therefore described in an illustrative but not in a restrictive sense. It is intended that the present invention should not be limited to the particular forms as illustrated and that all modifications which maintain the spirit and scope of the present invention are within the scope defined in the appended claims.

What is claimed is:
1. An image reading device, comprising:
  an optical part, comprises:
    a linear light source, extending long in a first direction; and
    a lens array, enabling light to converge on the light receiving component;
  a case having an accommodating portion for accommodating the optical part, the accommodating portion comprises:
    a lens accommodating portion for accommodating the lens array; and
    a light source accommodating portion for accommodating the linear light source, the light source accommodating portion comprises:
      a strip-shaped bottom surface overlapping with the linear light source when viewed from a third direction orthogonal to the first direction and a second direction; and a strip-shaped plane adjacent to the strip-shaped bottom surface in the second direction and not overlapping with the linear light source when view from the third direction; and a light receiving component accommodated in the case;

wherein the optical part is fixed in the accommodating portion through a first adhesive and a second adhesive, a hardening time of the second adhesive is longer than a hardening time of the first adhesive, the strip-shaped s lane is coated with the first adhesive, and the strip-shaped bottom surface is coated with the second adhesive.

2. The image reading device according to claim 1, wherein the strip-shaped plane has a plurality of first adhesive disposing regions arranged in the first direction; and the strip-shaped bottom surface has a plurality of second adhesive disposing regions arranged in the first direction.

3. The image reading device according to claim 1, wherein the case has a strip-shaped wall portion for separating the lens accommodating portion from the light source accommodating portion; and the strip-shaped bottom surface is located in the second direction in a manner of being clamped between the strip-shaped wall portion and the strip-shaped plane.

4. The image reading device according to claim 3, wherein the first adhesive disposing cavity is disposed on the strip-shaped wall portion, is concave in a manner of being away from the lens array in the second direction, and is coated with the first adhesive; and the second adhesive is coated in the first adhesive disposing cavity in a manner covering the first adhesive.

5. The image reading device according to claim 3, wherein the strip-shaped bottom surface has a central strip-shaped bottom surface vertical to the third direction, a first inclined surface clamped between the central strip-shaped bottom surface and the strip-shaped plane in the second direction, and a second inclined surface clamped between the central strip-shaped bottom surface and the strip-shaped wall portion in the second direction; and the first inclined surface and the second inclined surface are inclined in a manner of being further away from each other if they are further away from the central strip-shaped bottom surface in the third direction.

6. The image reading device according to claim 5, wherein the second adhesive is coated on the central strip-shaped bottom surface, the first inclined surface, and the second inclined surface.

7. The image reading device according to claim 1, wherein the strip-shaped plane is vertical to the third direction.

8. A method for manufacturing an image reading device, wherein the image reading device comprises:

an optical part extending long in a first direction and comprises a lens array enabling light to converge on the light receiving component, a case having an accommodating portion for accommodating the optical part, and a light receiving component accommodated in the case, wherein the accommodating portion comprises a lens accommodating portion for accommodating the lens array, the method comprising:

a first adhering step of using a first adhesive to fix the lens array in the lens accommodating portion; and a second adhering step of using a second adhesive to fix the lens array in the lens accommodating portion, wherein a hardening time of the second adhesive is longer than a hardening time of the first adhesive, wherein the first adhering step comprises a step of coating the first adhesive and a step of hardening the first adhesive, the second adhering step comprises a step of coating the second adhesive, a step of embedding the lens array into the lens accommodating portion is performed before the step of hardening the first adhesive, and the step of coating the second adhesive is performed after the step of hardening the first adhesive.

9. The method for manufacturing an image reading device according to claim 8, wherein the image reading device comprises a plurality of cavities, and the cavity is adjacent to the lens accommodating portion in a second direction orthogonal to the first direction and concave in a manner of being away from the lens array in the second direction; in the step of coating the first adhesive, the first adhesive is coated in any of the cavities; and in the step of coating the second adhesive, the second adhesive is coated in each of the cavities.

10. The method for manufacturing an image reading device according to claim 8, wherein the first adhesive is ultraviolet curable resin, and the second adhesive is silicone resin or epoxy resin; and the step of hardening the first adhesive comprises a step of irradiating an ultraviolet ray.

11. The method for manufacturing an image reading device according to claim 8, wherein the first adhesive is an instant adhesive, and the second adhesive is silicone resin or epoxy resin.

12. A method for manufacturing an image reading device, wherein the image reading device comprises:

an optical part, the optical part comprises a linear light source extending long in a first direction, a case having an accommodating portion for accommodating the optical part, and a light receiving component accommodated in the case, wherein the accommodating portion comprises a light source accommodating portion for accommodating the linear light source, the method comprising:

a first adhering step of using a first adhesive to fix the linear light source in the light source accommodating portion; and a second adhering step of using a second adhesive to fix the liner light source in the light source accommodating portion;

wherein a hardening time of the second adhesive is longer than a hardening time of the first adhesive, the first adhering step comprises a step of coating the first adhesive on the light source accommodating portion and a step of hardening the first adhesive coated on the light source accommodating portion; the second adhering step comprises a step of coating the second adhesive on the light source accommodating portion; and-a step of embedding the linear light source into the light source accommodating portion is performed before the step of hardening the first adhesive coated on the light source accommodating portion and after the step of coating the second adhesive on the light source accommodating portion.

13. The method for manufacturing an image reading device according to claim 12, wherein the step of coating the first adhesive on the light source accommodating portion is performed after the step of embedding the linear light source into the light source accommodating portion.

14. The method for manufacturing an image reading device according to claim 12, wherein the first adhesive is ultraviolet curable resin, and the second adhesive is silicone resin or epoxy resin; and the step of hardening the first adhesive coated on the light source accommodating portion comprises a step of irradiating an ultraviolet ray on the light source accommodating portion.

15. The method for manufacturing an image reading device according to claim 12, wherein the first adhesive is an instant adhesive, and the second adhesive is silicone resin or epoxy resin.

16. The method for manufacturing an image reading device according to claim 12, wherein the light source accommodating portion has a strip-shaped bottom surface overlapping with the linear light source when viewed from a third direction orthogonal to the first direction and the second direction, and a strip-shaped plane adjacent to the strip-shaped bottom surface in the second direction and not overlapping with the linear light source when viewed from the third direction; in the step of coating the first adhesive on the light source accommodating portion, the first adhesive is coated on the strip-shaped plane; and in the step of coating the second adhesive on the light source accommodating portion, the second adhesive is coated on the strip-shaped bottom surface.

* * * * *